Sept. 20, 1938.  C. A. CAMPBELL  2,130,714
AIR BRAKE
Filed April 2, 1938  3 Sheets-Sheet 1
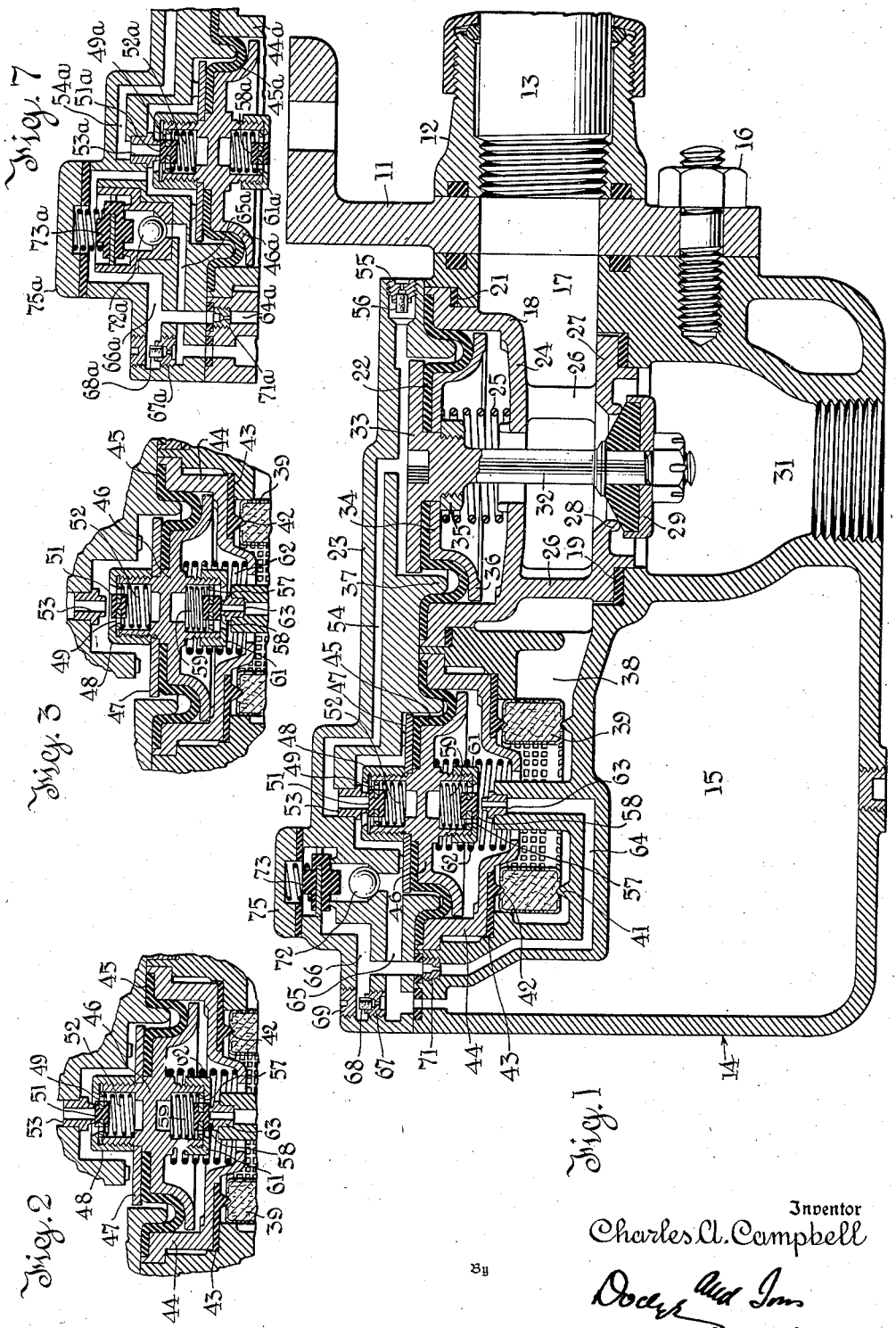
Inventor
Charles A. Campbell
By
Attorneys Sept. 20, 1938.  C. A. CAMPBELL  2,130,714
AIR BRAKE
Filed April 2, 1938  3 Sheets-Sheet 2

Inventor
Charles A. Campbell
By
Dodge and Sons
Attorneys

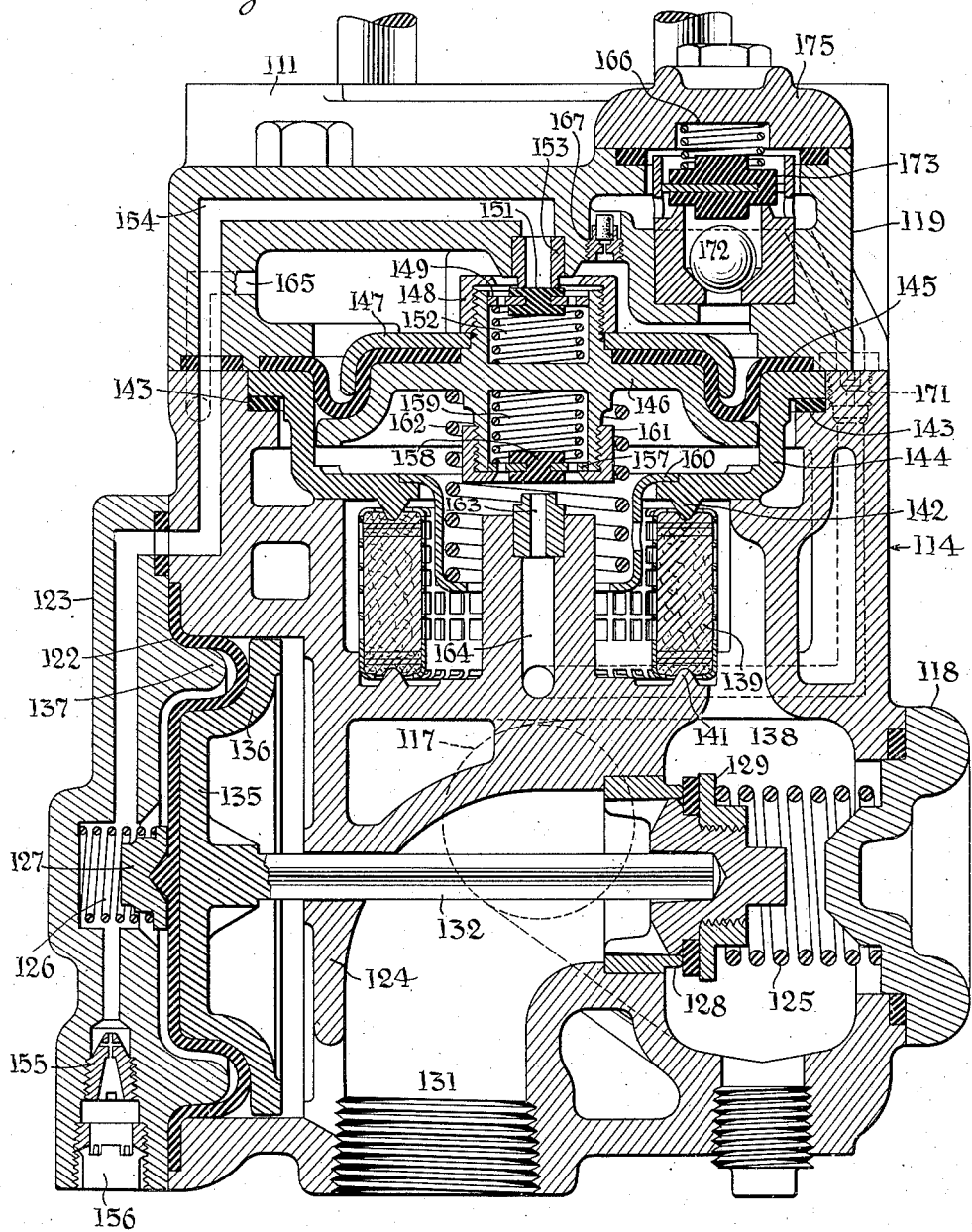

Patented Sept. 20, 1938

2,130,714

UNITED STATES PATENT OFFICE 2,130,714

AIR BRAKE

Charles A. Campbell, Watertown, N. Y., assignor to The New York Air Brake Company, a corporation of New Jersey Application April 2, 1938, Serial No. 199,720

9 Claims. (Cl. 303—82)

This invention relates to emergency brake pipe vent valves intended for use in automatic air brake systems. Such valves are customarily used in the brake pipe near the engineer's brake valve, but they are available for use at any point in the brake pipe at which emergency venting of the brake pipe may be desired.

In a prior application, Serial No. 181,040, filed December 21, 1937, I described and claimed an emergency vent valve of the diaphragm operated type and the present invention is in the nature of an improvement on the vent valve of that prior application.

The principal object of the invention is to secure a vent valve which will operate with a high degree of precision without requiring unduly precise manufacture and without the use of structural elements which are likely to stick or become clogged through long continued service.

The structures hereinafter described have a number of important advantages. The abutment which is interposed between the usual quick action chamber and the brake pipe and which controls the operation of the vent valve is a flexible diaphragm hereinafter called the "primary diaphragm." It does not operate the vent valve directly, but on the contrary admits pressure fluid from the quick action chamber to a secondary motor, also of the flexible diaphragm type, to open the vent valve. Consequently, the load imposed on the primary diaphragm is not heavy but is only that necessary to operate a very simple dual poppet valve mechanism.

Charging of the quick action chamber from the brake pipe is controlled by a small choke. The breathing action, i. e., the reflux from the quick action chamber to the brake pipe which occurs during service reductions, and serves to prevent emergency response of the primary diaphragm, is controlled by another and larger choke. During breathing the charging choke, which is of smaller capacity, is rendered ineffective to limit breathing flow by the action of a check valve which opens a by-pass around the charge controlling choke.

The breathing port which allows reflux from the quick action chamber to the brake pipe during service is closed by the emergency response of the primary diaphragm so that all the air in the quick action chamber is availed of during emergency reductions to operate the brake pipe vent valve.

A ring shaped filter is interposed between the brake pipe and the actuating mechanism of the vent valve in such a way as to protect all chokes and small valve seats from scale and grit. Very simple and compact means have been provided for mounting this filter in a highly desirable location.

Finally, the vent valve proper and its actuating motor or secondary diaphragm may take either of two alternative forms depending on the requirements of service.

The invention will now be described with reference to the accompanying drawings which illustrate three slightly different embodiments of the invention. In illustrating the first embodiment a diagrammatic showing in which some ports are transposed to a single plane of section has been adopted to facilitate tracing the flows which occur. The second embodiment which is the preferred form and differs from the first chiefly in the specific arrangement of the secondary motor and vent valve proper, is shown as it would be commercially constructed.

In the drawings:

Fig. 1 is a sectional view somewhat diagrammatic in character showing a vent valve embodying the invention. The valve is shown in charging and running position.

Fig. 2 is a fragmentary view showing the position assumed by the primary diaphragm and the valves actuated directly thereby in an intermediate position between the charging or running position of Fig. 1 and emergency position. This view shows how the breathing port is closed just prior to the opening of the port which feeds air from the quick action chamber to the secondary diaphragm chamber.

Fig. 3 is a view similar to Fig. 2 showing emergency position.

Fig. 6 is a section on the line 6—6 of Fig. 4 drawn on a considerably larger scale. The mechanism is shown in charging and running position.

Fig. 7 shows a modified port arrangement which may be used to prevent a reversal of the fluid pressure differential acting on the primary diaphragm. It is shown as a modification of the embodiment of Figs. 1 to 3 but can be used in the same way with the embodiment of Figs. 4 to 6.

Figure 4:
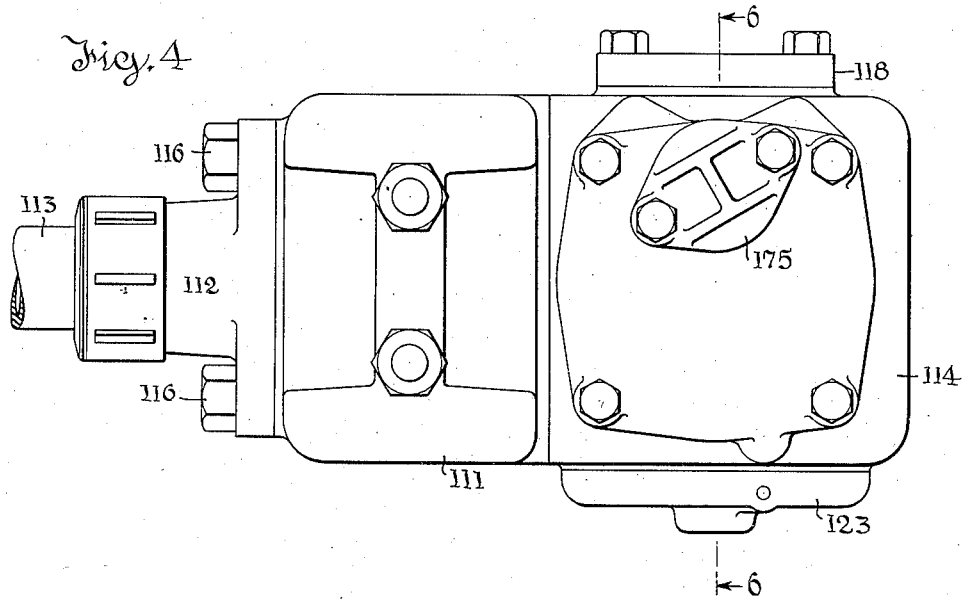
Fig. 4 is a plan view of the preferred embodiment of the vent valve.

Referring first to the embodiment shown in Figs. 1, 2 and 3, (and particularly to Fig. 1) a supporting bracket is indicated at 11. This is ported and receives at one side the union connection 12 for the brake pipe, a portion of which pipe is indicated at 13. Mounted against the other side of the bracket and in communication with the brake pipe is a hollow casting 14 having passages and chambers hereinafter described, and enclosing not only the quick action chamber generally indicated at 15, but also the various mechanisms making up the vent valve. Thus, the vent valve and its quick action chamber form a complete structural unit detachable from the bracket 11. The connection is made by studs and nuts, one of which studs, with its nut, is indicated at 16.

The brake pipe 13 communicates through the port in the bracket 11 with the chamber 17. Extending across this chamber is a spider 18 which is sealed to the casting 14 by two annular gaskets 19 and 21 and serves as a seat for margin of the secondary diaphragm 22, the diaphragm being clamped to its seat by appropriately formed portions of the cap 23. This cap serves as a removable cover for the body 14 and holds a number of other parts hereinafter described in assembled relation.

The spider 18 includes a disc-like portion 24 ported at its center, which serves both as a seat for the spring 25 and as a shield to protect the diaphragm 22 from the blast of air discharging from the brake pipe 13 during emergency venting. This disc 24 is connected by spaced legs 26 with the ring shaped portion 27 with which the gasket 19 seals, and the ring shaped member 27 carries a seat 28 for the rubber faced vent valve 29 which opens outward and which discharges into a downwardly extending passage 31 in free communication with the atmosphere.

The diaphragm 22 is of the slack or annularly folded type and is composed of any suitable material, preferably a special rubber compound extensively used for diaphragms in the air brake art. It operates the valve 29 through a stem 32 on which the valve 29 is mounted. The stem 32 passes through an aperture in the center of the diaphragm and is clamped to the diaphragm by means of a flat head 33 formed integrally with the stem and a clamping ring 34 which is forced toward the head 33 by a nut 35 threaded on the stem 32. The upper end of the spring 25, which is a compression spring, reacts against the ring 34. The clamp ring 34 is peripherally flanged as shown at 36 to guide the annular fold in the diaphragm 22. The flange 36 coacts with an opposed annular flange 37 on the cap 23 to control flexure of the diaphragm and prevent destructive distortion thereof.

It will be observed that the spring 25 biases the valve 29 in a closing direction so that in the absence of pressure on the upper side of the diaphragm 22, the valve moves to its seat. Inasmuch as the effective area of the diaphragm 22 exceeds the exposed area of the valve 29, brake pipe pressure will hold the valve 29 closed despite its outward opening characteristic so long as the space above the diaphragm 22 is at, or approximately at, atmospheric pressure.

The spider 18 is formed with the legs 26 so as not to obstruct the passage 17. The passage 17 communicates past the spider 18 with the space 38 surrounding an annular filter element 39. This element comprises an annular corrugated frame of foraminous material such as wire gauze or perforated sheet metal covered with any suitable filtering material, for example, wool fabric. Filters of this general type are extensively used in the air brake art. Any equivalent may be substituted. The filter 39 seats on an annular bead 41 and its upper end is sealed by a similar annular bead 42 formed on the gasket 43.

The gasket 43 not only seals the filter element 39 but also seals an insert 44 which serves as a clamping seat for the margin of the primary diaphragm 45. The marginal portion of the diaphragm functions also as a sealing gasket between the insert 44 and the cover 23 previously described. Thus, when the cover 23 is clamped in place it locks both diaphragm assemblies and the filter in place and exerts the pressure necessary to produce sealing engagement.

Clamped through the center of the primary diaphragm 45 is a valve-carrying hub structure made up of a lower plate 46, an upper plate 47, and a sleeve nut 48. The sleeve nut 48 clamps the members 46 and 47 upon the center of the diaphragm. The nut 48 is threaded upon a hollow or tubular extension formed on the upper face of the member 46. There is a similar tubular extension on the lower face of the member 46. The upper tubular extension houses a disc 49 having a central valve 51 of rubber or the like. This valve is urged upward or outward by a coiled compression spring 52 and the outward motion is definitely limited by an inwardly directed flange on the nut 48. The valve 51 seats in charging and running position against a seat bushing 53 and then closes communication to a port 54 which leads directly to the space above the secondary diaphragm 22.

A choke 55 affords a constantly open restricted vent from the space above the secondary diaphragm. This choke 55 is fitted with a filter capsule 56 of felt to protect the choke against clogging without, however, limiting the capacity of the choke, since the felt is substantially larger than the choke.

The tubular extension on the lower side houses a similar valve comprising a disc 57 with a central valve 58 urged outward by a coiled compression spring 59 and limited in its outward motion by the inwardly directed flange of a sleeve nut 61. The diaphragm 45 is urged upward by a stabilizing spring 62 which reacts between the member 46 and the insert 44. Under charging and running conditions, it holds the diaphragm upward so that valve 51 closes against seat 53 and prevents flow from the equalizing chamber 15 to port 54. At such time the space above the secondary diaphragm 22 is vented to atmosphere through the choke 55.

Upward motion of the primary diaphragm 45 withdraws the valve 58 from the seat 63. The valve 58 and its seat 63 control a breathing port 64. The parts are so dimensioned and arranged that if the primary diaphragm 45 moves downward in response to an emergency reduction of brake pipe pressure, the breathing port 64 will be closed by the valve 58 shortly before the passage 54 is opened by the valve 51.

The quick action chamber 15 is in free communication with the passage 65 which leads to the space above primary diaphragm 45, and is in restricted communication with the passage 66 through a small charging choke 67 which limits the rate of charging of the quick action chamber from the brake pipe. A small filter capsule 68 protects the choke 67 and this choke is mounted beneath a removable plug 69 so that it can be removed for inspection or replacement without removal of the cover 23.

The breathing port 64 is in communication with the passage 66 by way of a choke 71 of larger capacity than the choke 67 and designed to control the breathing flow, that is, the back flow from the chamber 15 to the brake pipe during service reductions. This it does without interference by the choke 67 for the reason that a ball check valve 72 and a rubber seated check valve 73, arranged in series, permit flow from the passage 65 to the passage 66, by-passing the choke 67 but close against flow in the reverse direction. Consequently, charging flow from the chamber 38 through the filter 39, valve seat 63, passage 64, choke 71, choke 67, is controlled as to rate by the choke 67 which is the smallest restriction in its path. Breathing flow, however, may take place from the chamber 15 partly through the choke 67 but chiefly past the valves 72, 73 and passage 66 directly to the large choke 71 and thence by the passage 64, valve seat 63, filter 39, chamber 38 and passage 17 to the brake pipe. A removable cap 75 gives access to the check valves.

Thus, the check valves permit a rate of charging flow which is smaller than the rate of breathing flow. Furthermore, the initial emergency response of the primary diaphragm 45 closes the valve 58 against the seat 63 and arrests the breathing flow. It does not arrest it at service reductions because a service reduction will not cause the diaphragm 45 to over-power the spring 62.

*Operation*

The main factors of operation have been described and only a brief summary is necessary. In initial charging, air entering from the brake pipe 13 flows through the passage 17 to the chamber 38, and thence through the filter 39, valve seat 63, passage 64, choke 71, and choke 67 to the chamber 15, charging the chamber to brake pipe pressure. Since the choke 67 is the smaller of two chokes in series it imposes the limit on the charging rate.

After the system is charged a service reduction of brake pipe pressure entails a corresponding reduction of pressure in the chamber 15 by way of check valves 72 and 73 (in parallel with choke 67) to choke 71 which limits the rate of back flow. Thence the flow is by passage 64, valve seat 63, filter 39, chamber 38 and passage 17 to the brake pipe.

Under all these conditions the valve 29 is held closed by the diaphragm 22 and spring 25.

If the brake pipe pressure is reduced at an emergency rate the back flow limited by choke 71 is not sufficiently rapid to prevent the development of a downward differential on the diaphragm 45 sufficient to over-power stabilizing spring 62. Consequently, the diaphragm moves downward and closes valve 58 on seat 63 and moves valve 51 from seat 53 so that back flow from the quick action chamber is terminated and the quick action chamber is placed in communication with the space above the secondary diaphragm 22. Since the pressure above the diaphragm is as high, and in fact slightly higher than the pressure beneath the secondary diaphragm, the diaphragm ceases to hold valve 29 closed, so that spring 25 is over-powered by brake pipe pressure acting outward on valve 29. It follows that the valve opens wide and vents the brake pipe. The valve will close after a time interval determined by the venting capacity of the choke 55.

*Modified embodiment*

Figure 5:
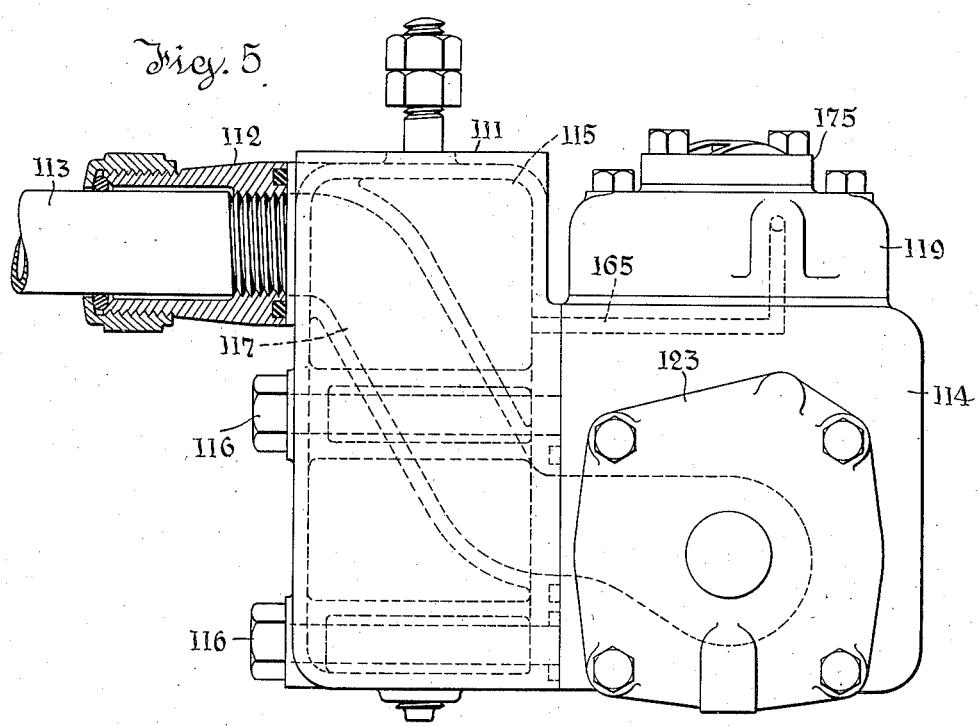
Fig. 5 is an elevation of the valve shown in Fig. 4, certain passages and chambers being indicated in dotted lines and the brake pipe connection being shown in section.

The commercial structure shown in Figs. 4 to 6 has exactly the same operative characteristic as those just described, except that the brake pipe vent valve is urged in a closing direction by brake pipe pressure, and the opposed face of the secondary diaphragm is subject to atmospheric pressure and not to brake pipe pressure. In the structure of Figs. 1 to 3 the secondary diaphragm probably responds somewhat more rapidly but the device is a little more sensitive to derangement by leakage between valve 29 and its seat.

In Figs. 4 and 5 the hollow casting 111 serves as a combined pipe bracket and quick action chamber. It is permanently mounted on the car by means of the studs at its upper end. The union 112 connects the brake pipe 113 to a cored passage 117 which leads through the casting, the remainder of the hollow interior of the casting serving as a quick action chamber 115. The main body 114 of the vent valve proper is clamped to bracket 111 by the threaded connecters 116, so that the brake pipe chamber 138 communicates with brake pipe passage 117. The space above the primary diaphragm is connected by a port 165 (later further described) with the quick action chamber 115.

The secondary diaphragm 122 is clamped at its margin by a removable cover plate 123, which in this embodiment clamps only the diaphragm 122. To the right of the diaphragm is a curved deflector plate 124 which is for the purpose of deflecting air discharged through the vent valve, so that it will not react on the right-hand side of the diaphragm 122. The seat 128 for the vent valve 129 takes the form of an inserted bushing and the valve is urged to its seat by a coiled compression spring 125 and also by brake pipe pressure in the chamber 138. A removable cap 118 sealed by a gasket permits the mounting and the removal of the vent valve. The vent valve 129 controls flow through the discharge port 131 which leads directly to atmosphere. The valve may be forced open by diaphragm 122 acting through the stem 132. This has a head 135 with a flanged peripheral diaphragm guiding portion 136. The diaphragm acts directly against the head 135 and the flange 136 controls flexure in conjunction with the rib 137 of cap 123. The center of the diaphragm is held against the head 135 by means of a light coil compression spring 126 with a spring seat 127.

The parts so far described involve the chief operative distinctions from the structure of Figs. 1 to 3.

The space 138 is in free communication with the space around an annular filter element 139 similar to the element 39 already described. This element seats at its lower face on a bead 141 and its upper end is engaged by a similar bead 142 formed on the insert 144 which is sealed to the body 114 by a gasket 143. The member 144 serves as a seat for the marginal portion of the primary diaphragm 145 which in turn serves as a sealing gasket between the body 114 and a removable cap 119.

Clamped through the center of the primary diaphragm 145 is a valve-carrying hub structure made up of a lower plate 146 and upper plate 147 and a sleeve nut 148. The sleeve nut 148 clamps the members 146 and 147 upon the center of the diaphragm 145, the nut being threaded upon a hollow or tubular extension formed on the upper face of the member 146. A similar tubular extension is formed on the lower face of this member. The upper tubular extension houses and guides a disc 149 having a central valve 151 of rubber or the like. This valve is urged outward by a coiled compression spring 152, its outward motion being limited by an inwardly directed flange on the nut 148. In charging and running position the valve 51 seats on and closes the port in a seat bushing 153 and thus interrupts communication between the space above primary diaphragm 145 and a passage 154 which leads to the space at the left of the secondary diaphragm 122. This space is vented to atmosphere at a restricted rate through a choke 155, shown as protected by a wasp excluder 156.

The tubular extension on the lower side of member 146 houses a valve disc 157 with a central valve 158 urged outward by a coiled compression spring 159 and limited in its outward motion by an inwardly directed flange on the sleeve nut 161.

The primary diaphragm 145 is urged upward by a coiled compression spring 162 which is the stabilizing spring and reacts between the member 146 and a spring seat 160. This seat 160 is made of pressed metal and is cup-shaped in form to afford sufficient length to the stabilizing spring 162. It enters the space within the filter element 139.

In the normal upward position of primary diaphragm 145, the valve 158 is lifted from its seat 163. This valve and its seat control the breathing port 164. The valves 151 and 158 have the same characteristics as the valve 51 and 58, that is, as the diaphragm moves down, overpowering the stabilizing spring 162, it first closes the valve 158 and then opens the valve 151. The quick action chamber 115 is in free communication with the space above the primary diaphragm 145 by way of the passage 165 which leads through cap 119, body 114, and the wall of bracket 11 as indicated in Figs. 5 and 6. The space above the primary diaphragm, and hence also chamber 115, is in restricted communication with the space 166 through a small charging choke 167 whose function is to limit the rate of charging flow from the brake pipe to the quick action chamber. A small filter capsule is associated with the choke 167.

The breathing port 164 is in communication with the space 166 by way of a choke 171 of larger capacity than the choke 167 suited to control the breathing flow already described. A ball check valve 172 and a rubber seated check valve 173, arranged in series, control flow between the space above the primary diaphragm 145 and the chamber 166, the arrangement being such that flow from the brake pipe toward the space above the primary diaphragm must pass through choke 167, whereas flow in the reverse direction may by-pass the choke 167 by way of the check valves. Thus, as in the first described embodiment, the small choke 167 controls charging flow, the larger choke 171 controls breathing flow, each without interference by the other.

By removing cap 119 from the body 114, access to the two flow regulating chokes 167 and 171 is afforded. It will be observed that choke 171 is mounted in the body 114 at the junction between body 114 and cap 119. Access to the check valves 172 and 173 is had by removing a cover plate 175.

*Operation of modified embodiment*

The operation of the device is exactly the same as that of the first embodiment so far as the functions of the primary diaphragm are concerned. When the primary diaphragm responds to an emergency reduction of brake pipe pressure, the breathing port is closed and quick action chamber air is admitted to the space to the left of the diaphragm 122. The space to the right is at atmospheric pressure. The diaphragm is of sufficient area to insure the rapid unseating of valve 129. The opening of this valve vents the brake pipe and the valve will be held open for a definite period determined by the venting action of choke 155.

The commercial structure has certain advantages. In the first place, the pipe bracket contains the quick action chamber and the connecting port to the vent valve. This can remain attached to the car while the entire vent valve structure may be removed as a unit by releasing the threaded connecters 116. Removal of the caps 123 and 118 give access to the secondary diaphragm mechanism and to the vent valve while the removal of cap 119 gives access to all the moving parts of the mechanisms associated with the primary diaphragm. The structure is simple, extremely compact, and when constructed with an ordinary commercial degree of accuracy will operate with remarkable precision over a long period of time without adjustment or even inspection.

*Alternative porting—Fig. 7*

Since the primary diaphragm mechanism of Figs. 1 to 3 is functionally identical with that of Figs. 4 to 6, and since the diagrammatic showing of Figs. 1 to 3 is easier to follow, Fig. 7 has been drawn on the basis of Figs. 1 to 3, but the porting can be substituted in the same way in Figs. 4 to 6.

In Figs. 1 to 6 control of the fold in the primary diaphragm is effected by the marginal contours of diaphragm clamping members, so that reversal of the pressure differential which tends to occur during charging is tolerable in many cases. The porting in these figures is such as to permit it to occur.

Fig. 7 shows how the scheme used in my prior application above identified can be used to preclude such reversal of pressure differential. The same reference numerals are used as in Figs. 1 to 3 but with the distinguishing letter *a*.

The changes from the structure of Figs. 1 to 3 are merely that (1) port 65a does not lead to the space above primary diaphragm 45a, and port 66a does lead to this space.

Consequently, during charging, choke 67a develops back pressure acting against the upper side of diaphragm 45a approximately equal to brake pipe pressure acting against the lower side. Choke 71a, being comparatively large, has no material flow restricting effect.

During breathing the flow is from the quick action chamber through the check valves as before. The slightly different connection to the space above the diaphragm has no functional significance. Elimination of the resistance of the check valve to flow from this space is beneficial so far as it has any effect.

In emergency, flow from the quick action chamber to the space above the primary diaphragm and thence via passage 54a to the secondary diaphragm must pass check valves 72a, 73a. Hence in Fig. 7 the check valves cannot be as small as they might be in Figs. 1 to 6, but since they cannot conveniently be made of the minimum size permissible for the structure of Figs. 1 to 6, and can easily be made as large as necessary for the arrangement of Fig. 7 this difficulty is not serious.

Commercially the check valves would be of about the size shown in either case, which is large enough for Fig. 7 and larger than strictly necessary for Figs. 1 to 3 (for example).

The choice of porting depends on particular conditions. For the general run of commercial installations Fig. 6 is preferred.

*General considerations*

Each of the various arrangements above explained is characterized by accurate control and proper differentiation of charging and breathing flows. The primary diaphragm operates small and simple valve mechanisms which are completely enclosed and hence fully protected. This diaphragm does not require precise guiding. In emergency functions all of the quick action chamber air passes to and through the secondary diaphragm chamber and hence is usefully applied. The secondary diaphragm motor is easily made of adequate size but of small enough clearance to ensure certain rapid action and economical use of air.

The construction is simple, involves no undue number of parts, and none requiring very precise manufacture. It is easily assembled and dismounted, requires no adjustments, and is very compact.

While I prefer the embodiments shown, these are to be taken as illustrative and not limiting.

What is claimed is:—

1. The combination of a brake pipe; a normally closed brake pipe bent valve; means forming a quick action chamber and a brake pipe chamber, the latter in communication with the brake pipe; a flexible diaphragm interposed between said chambers; motor means rendered active by substantial displacement of said diaphragm toward said brake pipe chamber to cause opening of said vent valve; yielding means resisting such displacement; means including a pair of restricted chokes affording communication between brake pipe and quick action chamber; one way flow valve means for inhibiting the controlling action of one of said chokes, whereby a differential is established between the rate of charging flow toward and breathing flow from said quick action chamber; and valve means rendered effective by motion of said diaphragm toward the brake valve chamber, at least as soon as said vent valve opening means is caused to operate, to arrest breathing flow from said quick action chamber.

2. The combination defined in claim 1 in which said chokes are arranged in series and the one way flow valve means opens a by-pass around the smaller thereof.

3. The combination with the structure defined in claim 1 of an annular filter substantially concentric with the diaphragm and interposed between said brake pipe chamber and the brake pipe; and an annular member which serves as a seat for the periphery of the diaphragm and a sealing retainer for said filter.

4. The combination of a brake pipe; a normally closed brake pipe vent valve; a pressure motor having a restricted vent, said motor serving to open said vent valve when pressure is developed therein; means forming a quick action chamber and a brake pipe chamber, the latter in communication with the brake pipe; a flexible diaphragm interposed between said chambers; a pair of controlling valve mechanisms on opposite sides of said diaphragm, each comprising a ported seat and a coacting poppet valve yieldably mounted on the diaphragm, such mounting including means to limit motion of the valve toward the seat relatively to the diaphragm, whereby the valves open selectively as the diaphragm moves reversely; a connection from the quick action chamber to said motor controlled by one of said valves; yielding means urging the diaphragm in a direction to close the valve just mentioned; a charging and breathing connection controlled by the other valve; and means comprising two chokes and a check valve for establishing a differential between the rate of charging flow through said connection toward said chamber, and the rate of breathing flow in the reverse direction therethrough.

5. The combination defined in claim 4 in which the pressure motor is of the diaphragm type, single acting, and the vent valve is a poppet valve urged in a closing direction by brake pipe pressure.

6. The combination defined in claim 4 in which the vent valve is a poppet valve urged in an opening direction by brake pipe pressure, and the pressure motor is of the double acting diaphragm type, has an effective area larger than that of the vent valve, and is subject in a valve-closing direction to brake pipe pressure.

7. The combination defined in claim 4 in which the chokes and check valve are so arranged that the smaller charge controlling choke is at the entrance to the quick action chamber and holds an approximately equalized back pressure on both sides of the diaphragm during charging, and the check valve permits rapid flow by passing both chokes from the chamber to the controlling valve associated with the vent valve motor.

8. The combination with the structure of claim 4 of plates clamped to the central portion of the diaphragm, the diaphragm being of the type having an annular fold and the plates being formed to control said fold as the diaphragm moves and also serve as the sole guiding means for the diaphragm and the associated control valves.

9. The combination of a brake pipe; a normally closed brake pipe vent valve; means forming a quick action chamber, a diaphragm chamber and a brake pipe chamber the latter in free communication with the brake pipe; a flexible diaphragm interposed between the diaphragm chamber and the brake pipe chamber; a flow controlling choke establishing restricted communication between the brake pipe and diaphragm chamber; a smaller flow controlling choke establishing a charging communication from the diaphragm chamber to the quick action chamber; one-way flow valve means for permitting flow unlimited by the last named choke from the quick action chamber to the diaphragm chamber; motor means rendered active by substantial motion of said diaphragm toward the brake pipe chamber to open said vent valve; valve means rendered operative by less motion of the diaphragm in the same direction to close communication between the brake pipe and diaphragm chamber; and yielding means resisting motion of the diaphragm toward the brake pipe chamber.

CHARLES A. CAMPBELL.